United States Patent [19]

Grinwald

[11] Patent Number: 4,530,411
[45] Date of Patent: Jul. 23, 1985

[54] MOTORIZED WHEELS FOR DOLLY STRUCTURES

[75] Inventor: Israel M. Grinwald, Oakland, Mich.

[73] Assignee: The United States of America as represented by the Secretary of the Army, Washington, D.C.

[21] Appl. No.: 514,984

[22] Filed: Jul. 18, 1983

[51] Int. Cl.³ ............................................. B62D 59/04
[52] U.S. Cl. ........................................ 180/11; 280/35
[58] Field of Search ................ 280/35, 43.23; 180/11

[56] References Cited

U.S. PATENT DOCUMENTS

| | | | |
|---|---|---|---|
| 2,968,490 | 1/1961 | Baus | 280/35 |
| 3,131,950 | 5/1964 | Weaver, Jr. et al. | 280/43.2 |
| 3,253,668 | 5/1966 | Tantlinger | 180/11 |
| 3,318,611 | 5/1967 | Branning | 180/11 |
| 3,378,276 | 4/1968 | Fulmer | 280/43.23 |
| 3,521,898 | 7/1970 | Fulmer et al. | 280/43.23 |

Primary Examiner—Joseph F. Peters, Jr.
Assistant Examiner—Donn McGiehan
Attorney, Agent, or Firm—Peter A. Taucher; John E. McRae; Robert P. Gibson

[57] ABSTRACT

Mechanism to be added to existing two-wheeled dolly structures used for towing military shelter units from one geographical location to another. The add-on mechanism includes a motorized wheel unit attachable to the dolly structure to facilitate manipulation of the dolly structure into precise alignment with the shelter; the add-on mechanism further includes motor means for powering a hydraulic pump used to actuate certain lift cylinders on the dolly structure. The add-on mechanisms reduce the time expenditure required to hook the dolly to the shelter and raise same into a condition suitable for towing by a military truck.

7 Claims, 11 Drawing Figures

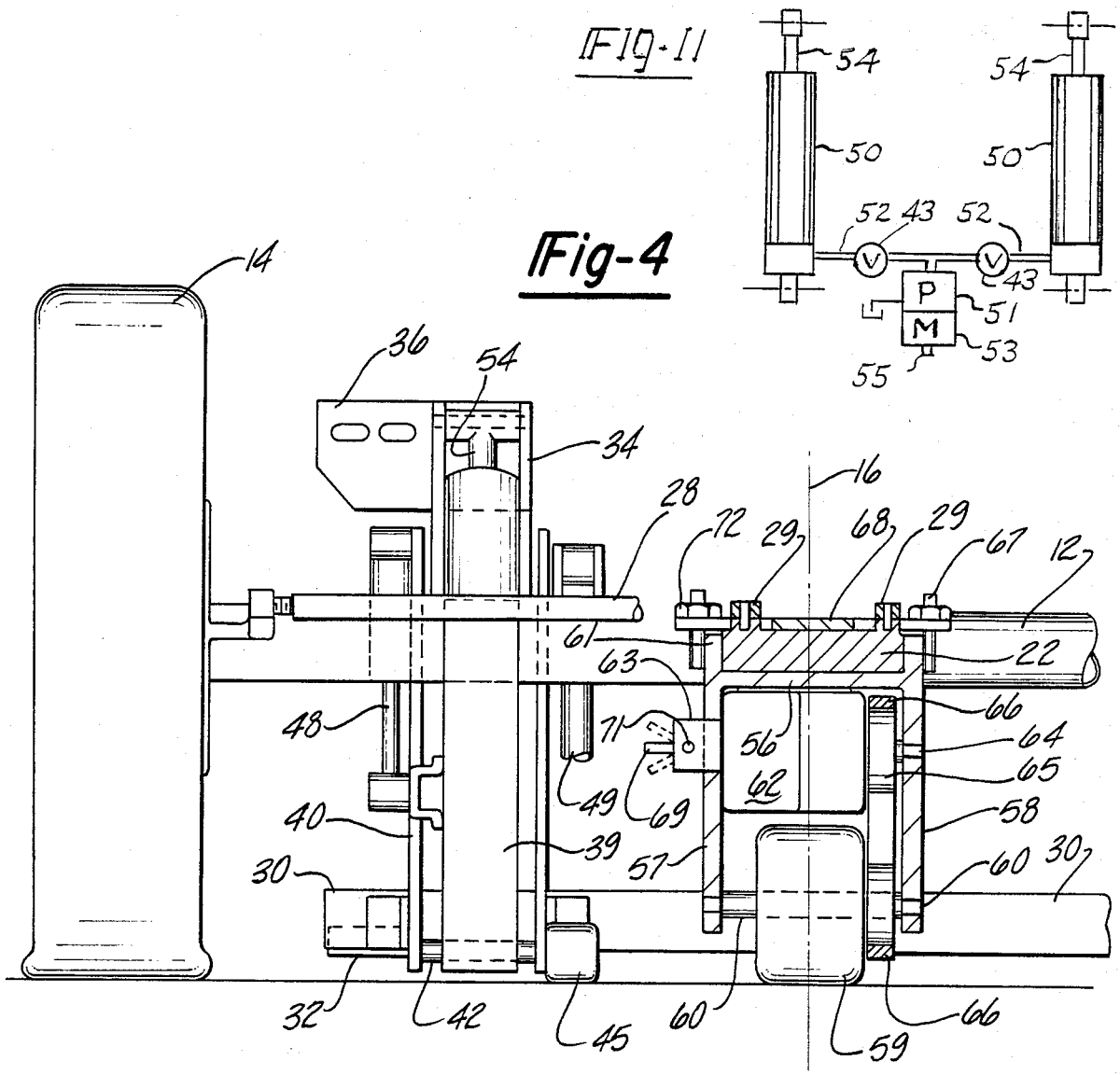
Fig-11
Fig-4
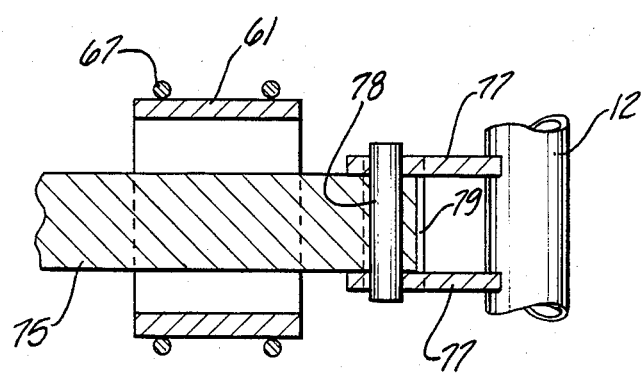
Fig-10

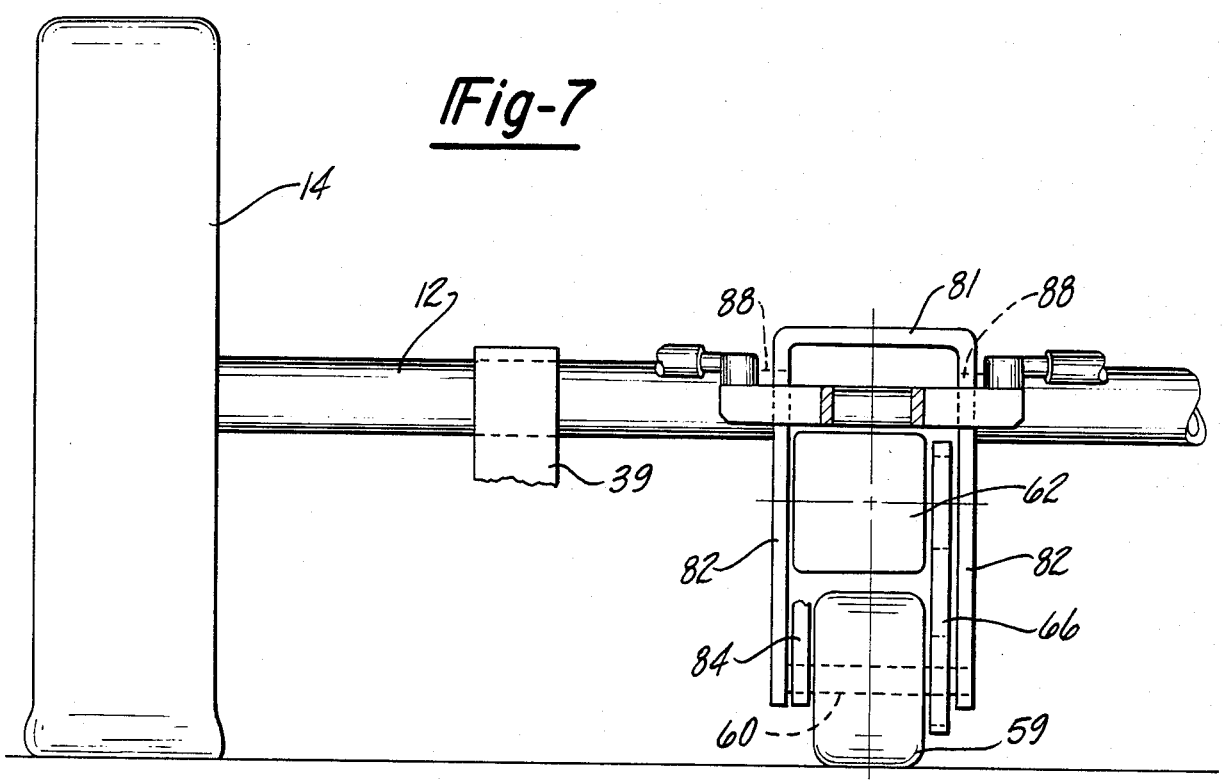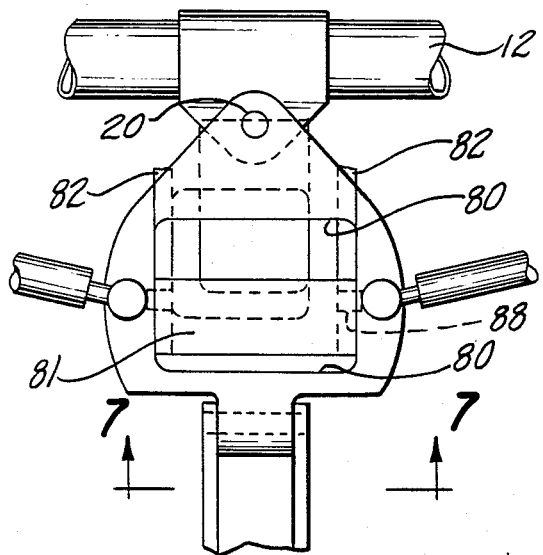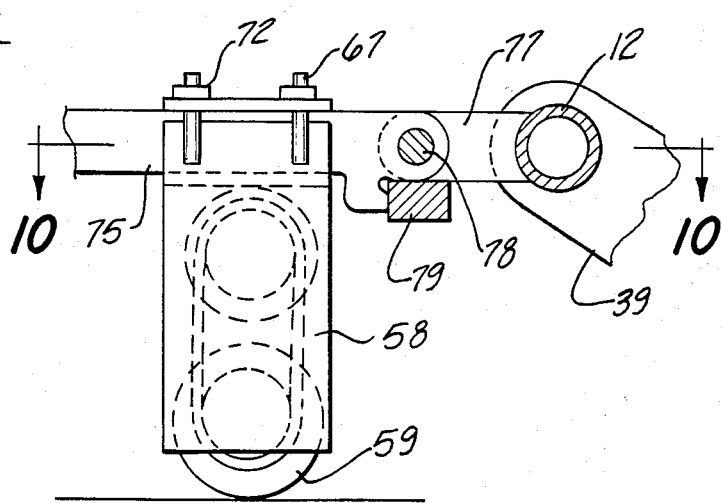

MOTORIZED WHEELS FOR DOLLY STRUCTURES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to two-wheeled dolly units used by U.S. military forces to tow shelter units from one geographical location to another. Such shelter units are usually large box-like containers approximately seven feet wide, seven feet high, and fifteen feet long. They are used for such purposes as emergency hospital buildings, electronic radar equipment enclosures, and temporary command headquarters buildings. Each shelter has skids on its bottom surface for support of the shelter on the terrain. At each of its ends the shelter is equipped with fittings for attaching the shelter to a two-wheeled dolly when it is desired to tow the shelter to a new geographical location. The dollies give the shelter the mobility of a trailer.

Certain preparations are necessary to put the shelter into the so-called "towing" mode. One dolly is moved into position at the front end of the shelter; later, or simultaneously, the other dolly is moved into position at the other (rear) end of the shelter. Each dolly is affixed (attached) to the shelter, after which a fluid cylinder mechanism on each dolly unit is actuated to lift the shelter away from the ground surface, usually about 17 inches. A towbar at the frontmost dolly is attached to a military truck for enabling the dolly-shelter assembly to be towed to a new geographical location.

At the destination the fluid cylinder mechanisms on the dolly units are actuated to lower the shelter to the ground. The dolly units are disengaged from the ends of the shelter and bolted together into a four wheel package for towed transport to storage or another shelter requiring relocation.

Over the years the shelter units have been used for housing heavier types of equipment. Accordingly the dolly units have had to be redesigned as more massive and heavier structures, compared to the earlier dolly units. Some of the two wheeled dolly units, built or contemplated, weigh upwards of 1000 pounds (2000 pounds per dolly set). Due to the large dolly weight it becomes difficult to manually maneuver the dolly units preparatory to hook-up to a shelter unit. Considerable time and effort is usually required to precisely align the lifter elements on the dolly with the lift fittings on the shelter.

Another difficulty is presented by the nature of the fluid cylinder mechanisms used on existing dollies to lift the shelter unit away from the ground surface. Each dolly is usually provided with two hydraulic cylinders connected to a hand pump. The work effort is such that many human arm strokes are required to operate the pump the necessary length of time to pressurize liquid and deliver the required liquid quantities to the cylinders. Often more than 100 strokes of the pump are required.

The above difficulties result in a considerable time expenditure for attachment of the dolly units to a shelter and lifting of the attached shelter to an elevated position suitable for towing to a new location. Often twenty minutes or more are required to complete the attaching-lifting operation. Under battle conditions the soldiers might not have such a period of time; the shelter might then have to be abandoned.

The present invention relates to mechanisms for decreasing the time required to accomplish the operations of attaching the dolly units to the shelter and raising the shelter to the transport mode. To decrease the time required for attaching each dolly unit to a shelter I propose to equip each dolly unit with a motorized wheel assembly. Each motorized assembly comprises an air-operated motor having a drive connection with an auxiliary ground wheel. The tractive action of this auxiliary wheel augments the efforts of the soldiers required to maneuver the dolly unit back and forth into precise alignment with the lift fittings on the shelter. It is believed that by using the auxiliary motorized wheel assembly the soldiers will be enabled to accomplish the dolly-shelter attachment operation in a shorter time period (compared to the time required without using the motorized wheel assembly).

To decrease the time required for raising the attached shelter to the towing mode I propose to modify the mechanism used to pressurize the shelter lift cylinders. The proposed modification involves substitution of a motor-operated pump for the manual pump used under conventional practice. Preferably the pump will be powered by an air motor. The basis for the proposed substitution is the fact that military trucks used for towing shelters are equipped with on-board air compressors. It is believed that such compressors can deliver energy to an air-operated motor at a comparatively fast rate, compared to the rate of energy delivery achieved by human force on a pump operator (handle). Use of compressed air for energizing an air motor will necessitate running a compressed air hose from the air compressor on the truck to an air motor on each dolly. I contemplate that a single air hose will be used to supply compressed air to the motors for the hydraulic pump and motorized wheel assembly.

THE DRAWINGS

FIG. 4 is a sectional view taken on line 4—4 in FIG. 3.

Figure 5:
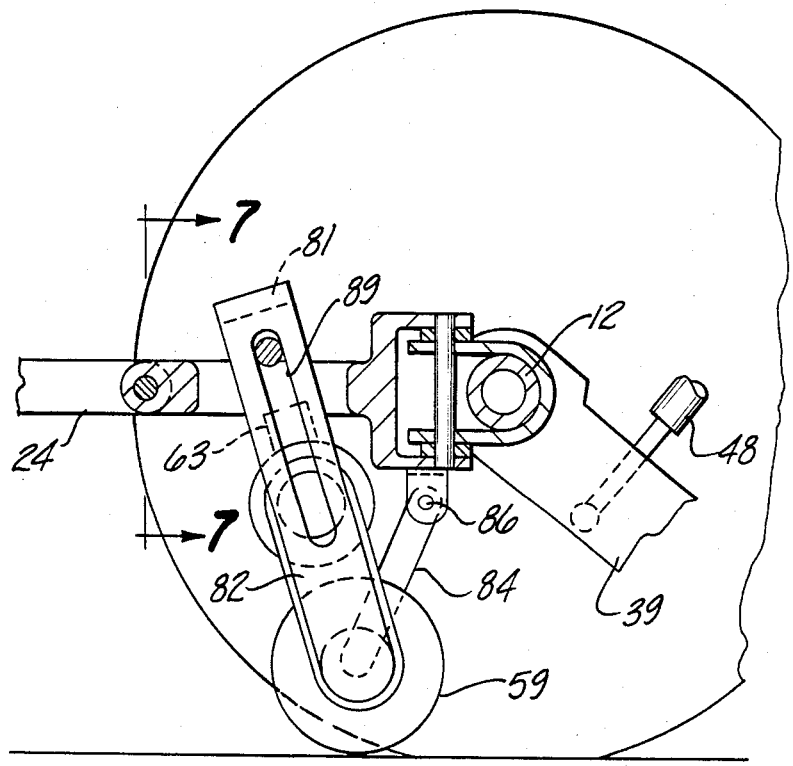
Figure 6:
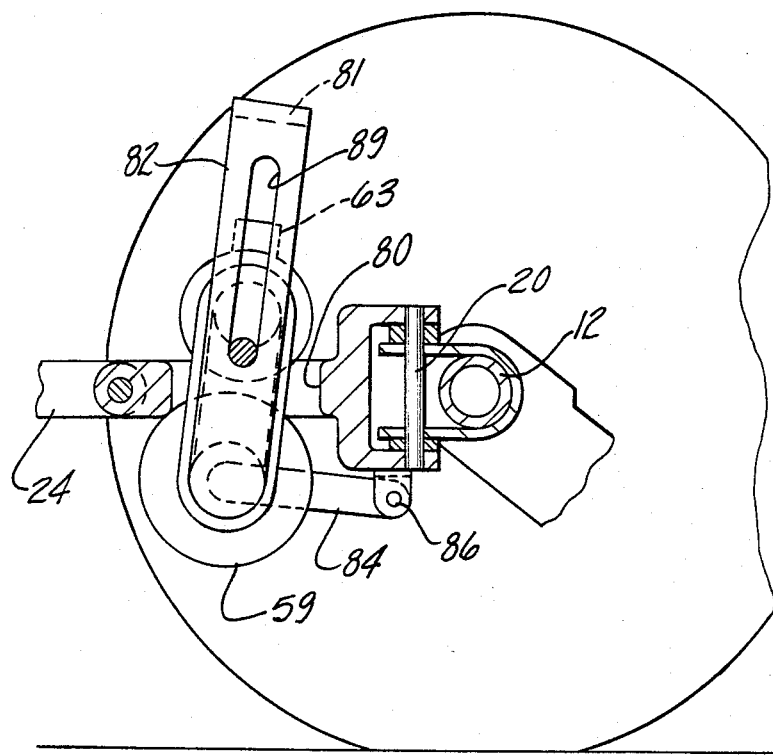

FIGS. 5 and 6 are fragmentary side elevational views of a modified dolly having a second embodiment of the invention thereon. FIG. 5 shows the motorized wheel in a retracted stowed position. FIG. 6 shows the wheel in an extended operating position engaged with the ground surface.

FIG. 7 is a fragmentary sectional view taken on line 7—7 in FIGS. 5 and 8.

FIG. 8 is a fragmentary top plan view of the FIG. 7 structure.

Figure 1:
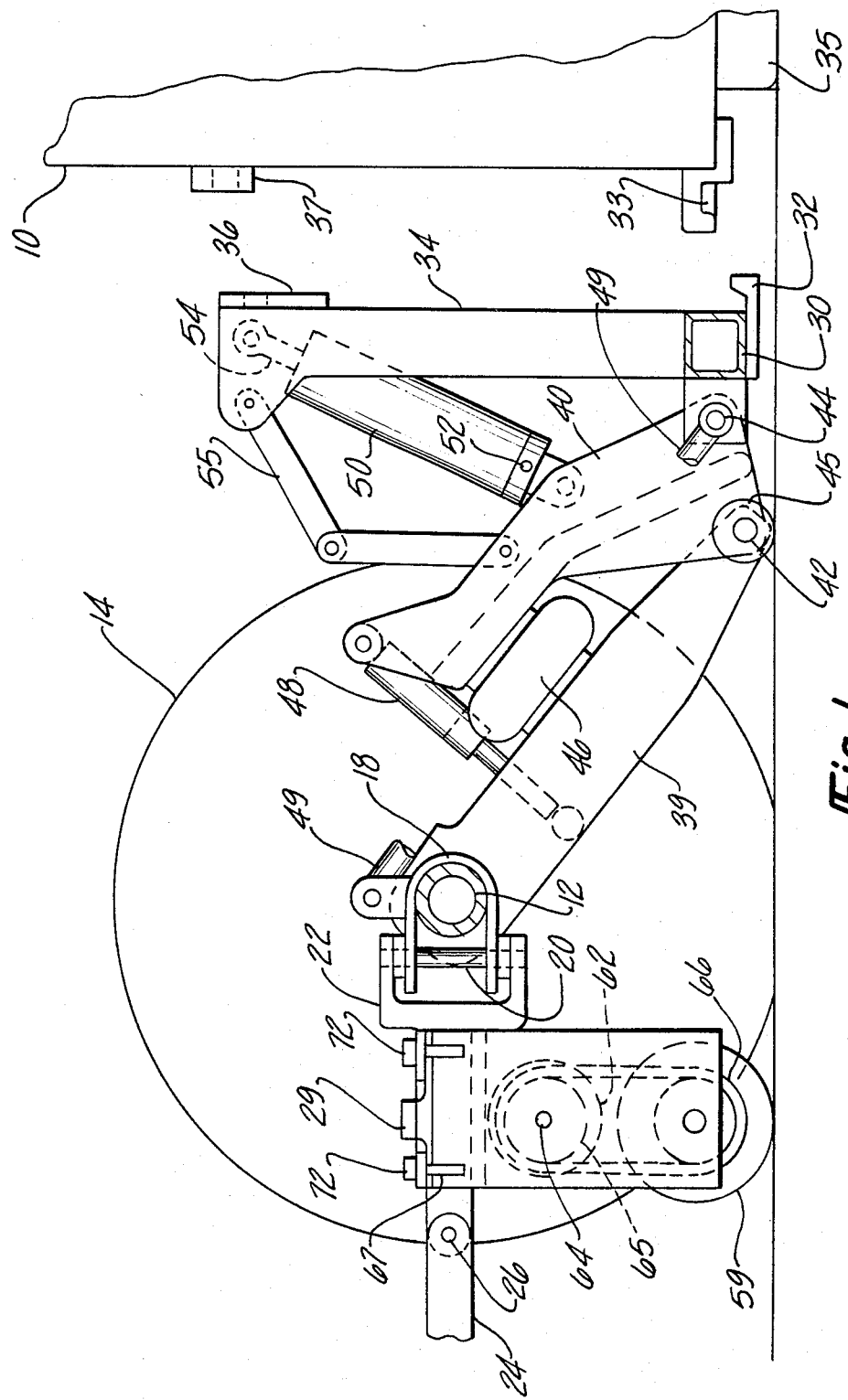
FIG. 1 is a side elevational view of a two-wheeled steerable dolly having an auxiliary motorized wheel assembly constructed according to the present invention.
Figure 2:
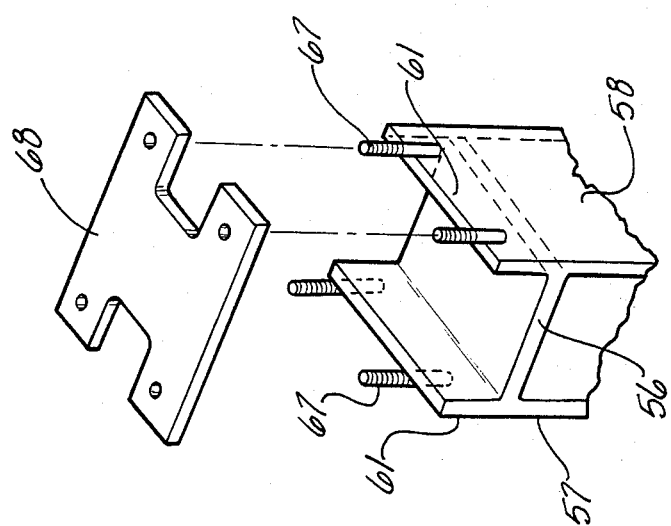
FIG. 2 is a perspective view of a mechanism for attaching the FIG. 1 wheel assembly to the FIG. 1 dolly.

FIG. 9 is a fragmentary side elevational view of a non-steerable dolly equipped with the FIG. 1 motorized wheel.

FIG. 10 is a sectional view on line 101 in FIG. 9.

FIG. 11 diagrammatically shows a pump-cylinder arrangement used in the FIG. 1 embodiment of the invention.

GENERAL DOLLY CONSTRUCTION

Figure 3:
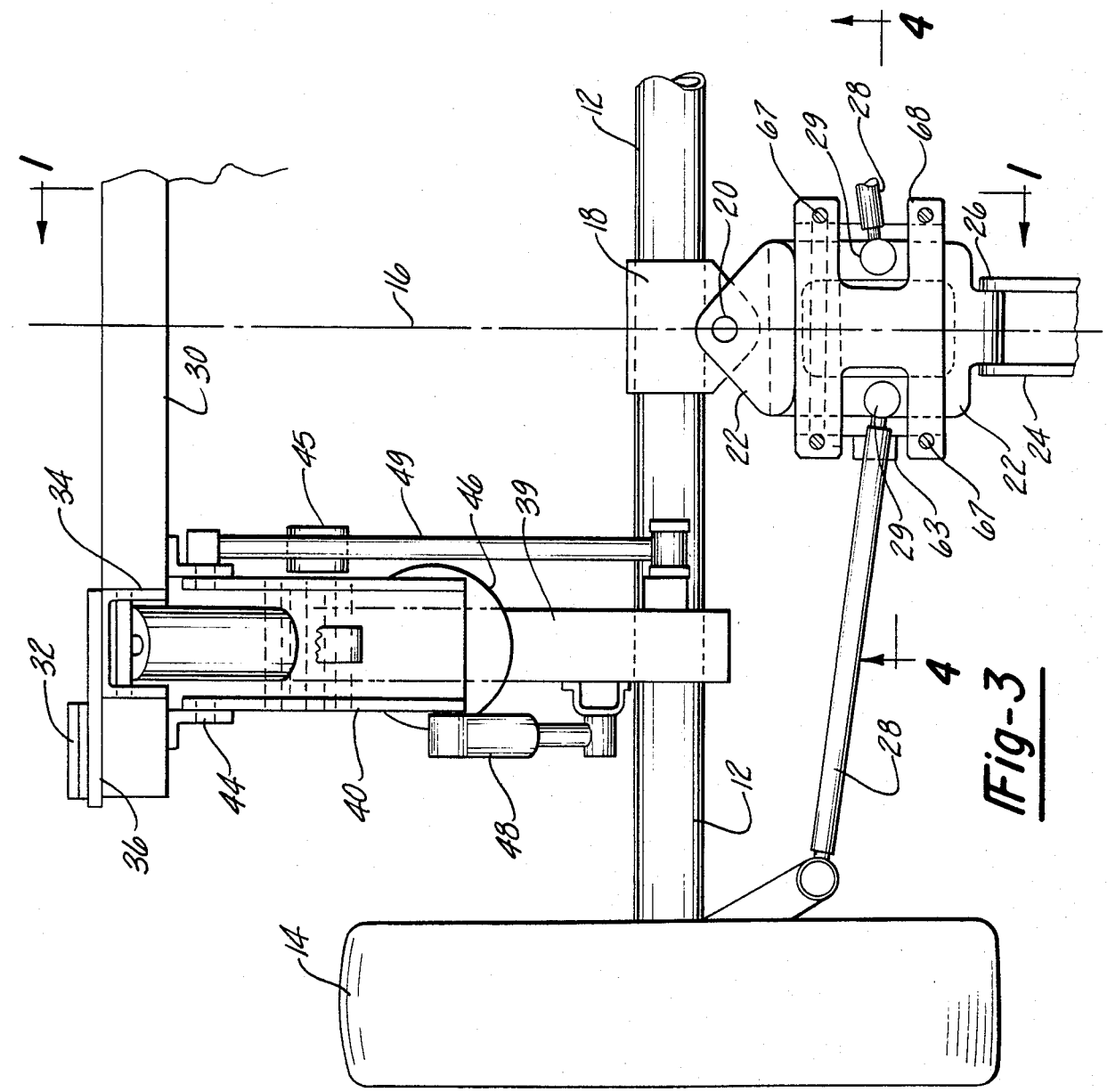
FIG. 3 is a fragmentary top plan view of the FIG. 1 assembly.

Referring more particularly to FIGS. 1 through 4, there is shown a steerable dolly unit attachable to the so-called front end of a shelter unit 10. The general arrangement is similar to that depicted in any of several U.S. patents, e.g., U.S. Pat. Nos. 2,968,490 to Baus, 3,131,950 to Weaver et al, 3,378,276 to Fulmer, or 3,521,898 to Fulmer et al. The dolly comprises a transverse axle 12 suitably connected to a pair of road wheels 14, only one of which is visible in the drawings. FIGS. 3 and 4 show one half of the complete dolly; the components to the right of the dolly longitudinal centerline 16 in FIGS. 3 and 4 are similar to the illustrated components.

At a point midway along its length axle 12 is provided with a heavy strap 18. A vertical pivot pin 20 extends through the strap and rearwardly extending flanges on a steering link 22. The front end of the steering link extends into a towbar 24; a horizontal pivot pin 26 connects the steering link to the towbar. The non-illustrated front end of the towbar is provided with a conventional eye member for connection to the pintle mechanism on a towing vehicle, e.g., a military truck. Pivot connection 26 enables the towbar to pivot in a vertical plane; pivot connection 20 enables link 22 to swing in a horizontal plane. Conventional tie rods 28 extend from pivot connections 29 on link 22 to each road wheel 14 for translating swinging motion of the steering link into steering adjustments of the road wheels. The rear dolly unit (not shown) is generally similar to the illustrated front dolly unit except that it is non-steerable, i.e., it does not have a central steering link, tie rods or towbar.

SHELTER ATTACHMENT MECHANISM

Referring especially to FIG. 1 the dolly is provided with a transverse lifting bar 30 having suitable lifter elements 32 extending rearwardly for engagement on the undersurfaces of lift structures 33 carried by the front wall of shelter unit 10. There are actually two lifter elements 32, spaced equidistant from the longitudinal centerline of the dolly unit. Similarly, the front wall of the shelter unit 10 is provided with two lift structures (fittings) 33. The non-illustrated rear wall of the shelter has similar lift structures engageable with lifter elements on the rear dolly unit (not shown). Skids 35 are provided on the shelter bottom wall to support the shelter on the ground surface.

Extending upwardly from bar 30 are two posts 34, only one of which is shown. Each post has an apertured plate 36 secured thereto. The plate 36 locations are selected so that when lifter elements 32 are engaged with lifter surfaces 33 on the shelter the openings in plates 36 will align with threaded openings in upper fittings 37 on the shelter end wall. Suitable bolts (not shown) are threaded through plates 36 into fittings 37 to rigidly secure the bar 30 post 34 bracket unit to the shelter. Bar 30 and posts 34 may be viewed as a shelter-connecting bracket mechanism.

DOLLY SUSPENSION

Conventional suspension arm structures extend from axle 12 to lifing bar 30. Each suspension arm structure includes an upwardly swingable road arm 39 having a rotary fit on axle 12, and a link 40 having pivot connections 42 and 44 with arm 39 and bar 30. A small ground roller 45 may be rotatably mounted on each pivot connection 42 to provide partial support for the dolly when it is in its illustrated lowered position. The suspension means for the dolly includes a conventional air bag 46 and shock absorber 48 trained between each link 40 and the associated arm 39. Conventional stabilizer arms 49 are trained bewteen axle 12 and lifting bar 30.

SHELTER LIFT MECHANISM

Motive force for raising the dolly and attached end of the shelter is provided by two hydraulic cylinders 50 trained between posts 34 and the associated links 40. At its lower end each hydraulic cylinder 50 is connected to a hydraulic hose 52 leading from a hydraulic pump, not shown in FIG. 1. FIG. 11 diagrammatically shows a preferred mechanism for pressurizing cylinders 50 to provide the shelter lift force. Hydraulic pump 51 is powered by an air motor 53 having a compressed air hose connection 55. Manual valves 43 in hydraulic lines 52 control flow of hydraulic fluid to respective ones of cylinders 50. At any one time either or both of valves 43 can be opened or closed.

It is contemplated that the air hose can be run from an air compressor or pressure vessel on board the towing vehicle to air intake fitting 55. With valves 43 opened the piston rods 54 for cylinders 50 can be extended to thereby raise the attached end of shelter 10. In the fully raised position of the shelter road arms 39 assume horizontal positions. While the shelter is being towed cylinders 50 can be depressurized; conventional strut mechanisms 55 then carry the load forces otherwise tending to collapse the dolly structure.

MOTORIZED WHEEL ASSEMBLY

The manual operation of maneuvering the dolly into a position where it can be initially attached to the shelter ordinarily requires considerable time and human effort, especially with heavy dollies weighing in excess of 1000 pounds. To reduce the time and human effort involved to accomplish the precision maneuvers I propose as a feature of my invention to equip the dolly with an auxiliary motorized wheel assembly. As shown in FIGS. 1 through 4, the add-on wheel assembly comprises a yoke support structure that includes an upper web wall 56 and two downwardly extending arms 57 and 58. A ground wheel 59 is mounted within the yoke structure by means of an axle 60. The space above wheel 59 is occupied by an air-operated motor mechanism 62; mechanism 62 can be attached to web wall 56 or to arm 57. Mechanism 62 has an output shaft 64 that carries a pulley or sprocket 65. An endless flexible drive-transmitting device 66, such as a belt or chain, is trained around rotary member 65 and a similar member on axle 60. Member 66 thus serves as the immediate drive means for wheel 59.

The motorized wheel assembly is attachable to steering link 22 by positioning the wheel assembly below the link, with web wall 56 engaging the link undersurface. The yoke structure includes two shoulder walls 61 spaced to engage side surfaces of link 22 to preclude undesired lateral displacement of the wheel assembly from the link. Four threaded studs 67 are permanently affixed to the yoke structure for projection through openings in a separate clamping plate 68; butterfly nuts 72 may be threaded onto the upper ends of studs 67 to apply the desired clamping force. The motorized wheel assembly is removable from link 22 when the dolly is being towed by a military truck. The motorized wheel assembly is attached to link 22 when it is desired to maneuver the dolly into a position in which lifter elements (FIG. 1) are directly below lifter surfaces 33 on the shelter. Such maneuvers are aided by operation of air motor mechanism 62.

Mechanism 62 preferably includes two separate components bolted together into a unitary assembly. The left part of the assembly (FIG. 4) may be a vane type air motor, and the right part of the assembly may be a gear type speed reducer for lowering the speed of the output shaft 64 to a suitable value commensurate with the desired speed of ground wheel 59. With a wheel 59 diameter of eight inches and a desired wheel 59 velocity of about one foot per second the desired speed of shaft 64 is about one half revolution per second (30 r.p.m.). The speed reducer is selected according to the estimated speed of the vane type air motor and the desired speed of shaft 64.

In order to achieve back-and-forth maneuverability for the dolly it is desirable that the air motor mechanism be capable of operation in two directions, i.e., clockwise and counterwise. A suitable manually-operated flow selector valve 63 may be provided on the air motor. Manual operating lever 69 for the valve is actuated in opposite directions from the normally closed condition (full lines in FIG. 4) to direct compressed air from an air intake fitting 71 to one or the other of two intake ports in the vane motor housing. The previously mentioned flexible air hose may be used to supply compressed air to fitting 71. While the dolly is being maneuvered with the use of ground wheel 59 the air hose is locked onto fitting 71 by a suitable quick connect device, not shown. Lever 69 is operated manually to control the direction taken by powered wheel 59.

As previously noted, link 26 can be swung around the axis of pivot pin 20 to adjust the directions taken by wheels 14. Yoke structure arms 57 and 58 are rigid with link 22 so that wheel 59 is oriented in the same direction as dolly wheels 14,14. By moving towbar 24 in a side-to-side direction the soldier can adjust the direction of wheels 14 and wheel 59. Wheel 59, when powered by air motor mechanism 62, provides a significant percentage of the brute force needed to move the dolly toward or away from shelter 10 during the process of aligning lifter elements 32 with lifter surfaces 22. Some of the needed force may be provided by the soldiers, as under previous practice. The motorized wheel device is intended to supplement human force such that very heavy dolly structures can be maneuvered into alignment with the shelter in a shortened period of time. The motorized wheel device may also be useful during subsequent operations required to connect the front and rear dolly units together for transport or storage, in the manner shown fragmentarily in FIG. 8 of aforementioned U.S. Pat. No. 3,131,950.

FIGS. 9 AND 10

FIGS. 9 and 10 show the motorized wheel assembly in an operative position on the rear non-steerable dolly. The axle 12 does not have a steering link corresponding to link 22. To manually maneuver the dolly it is common practice to use an elongated steering rod 75. The end of this rod has a transverse circular opening therethrough alignable with openings in two spaced ears 77 suitably welded to axle 12. A pin 78 provides a removable connection between rod 75 and ears 77. To prevent undesired downward buckling of the rod an abutment bar 79 may be welded to ears 77.

In the normal towed mode of the dolly, pin 78 and rod 75 are removed from ears 77; the rod is stowed on the dolly in parallelism with axle 12. When it is desired to manually maneuver the dolly toward or away from the rear end of the shelter rod 75 is pinned to ears 77, as shown in FIGS. 9 and 10.

I envision that the aforementioned motorized wheel assembly could be clamped to steering bar 75 in roughly the same fashion as it is attached to link 22 (FIG. 1). When thus attached the motorized wheel assembly should be able to provide a major portion of the brute force needed to move the dolly. Steering of the dolly is accomplished by swinging bar 75 in side-to-side directions.

FIGS. 5 THROUGH 8

FIGS. 5 through 8 illustrate an embodiment of the invention wherein the motorized wheel assembly is permanently attached to steering link 22 of the front dolly. The steering links is modified to have a central opening 80 for accommodating parts of the motorized wheel assembly. The yoke structure for the motorized wheel includes an upper wall 81 and two side walls 82. Axle 60 for wheel 59 extends through a link 84 that has a pivotal anchorage 86 on the undersurface of steering link 22. The soldier can move the wheel assembly from the extended operating position (FIG. 5) to the retracted storage position (FIG. 6) by exerting an upward pulling action on yoke wall 81; wall 81 serves as a handle. The wheel assembly is guided during the adjusting movements by two spaced pins 88 affixed to the upper surface of link 22 and extending into elongated guide slots 89 in yoke side walls 82. The motorized wheel may be releasably held in its elevated position (FIG. 6) by latch mechanism, not shown.

Operation of the motorized wheel assembly in the FIG. 5 mode is similar to that of the FIG. 1 mechanism. The retractable mounting feature of FIGS. 5 through 8 could be applied to the rear dolly. However the dolly would have to be modified to provide a mounting structure for the retraction mechanism. Some added cost would be involved.

The preferred embodiment of the invention is illustrated in FIGS. 1 through 4, 9 and 10. The motorized wheel mechanism there shown represents a simple add-on unit that can be economically utilized with either the front dolly or rear dolly. Dolly modifications would not ordinarily be required if the yoke mechanism were appropriately configured to mate with the dolly components.

As previously noted, the principal aim of this invention is to reduce the time required to attach the front or rear dolly to the shelter unit, and to lift the shelter unit from the ground surface to the elevated condition suitable for transport purposes. I believe the motorized wheel assembly will reduce the attachment time by lessening the time required to align lifting elements 32 with shelter lift surfaces 33. To reduce the time required to lift the shelter into the towing mode I propose to power the cylinder pump 51 (FIG. 11) with an air motor 53. Compressed air can be supplied to air motor 53 and air motor 62 through a compressed air hose extendable from the truck used for towing the shelter.

Conceivably the air motors could be replaced with electric motors having similar functional effects. However I prefer to use air-operated devices because military trucks are commonly provisioned to include on-board air compressors. Such trucks are not usually equipped with on-board electric generators.

I wish it to be understood that I do not desire to be limited to the exact details of construction shown and described for obvious modifications will occur to a person skilled in the art, without departing from the spirit and scope of the appended claims. The invention was concieved especially for use on dolly structures used for towing military shelter units from one geographical location to another. It may be possible to use the invention in other non-military situations.

I claim:

1. In a two-wheel dolly for lifting and towing an upright shelter unit, said dolly comprising an axle, two road wheels at opposite ends of the axle, a central steering link pivotably connected to the axle at a point midway between the road wheels, said link having a pivot axis extending normal to the axle whereby the link is normally swingable in a horizontal plane, tie rods extending between the road wheels and steering link for translating swinging movement of the link into steering adjustments of the road wheels, a towbar extending from the steering link for connection to a towing vehicle, bracket means for connecting the dolly unit to the shelter unit, said bracket means including a lifting bar extending parallel to the axle for positionment near an end wall of a shelter unit, said lifting bar having laterally spaced lifter elements projecting therefrom for engagement with lift surfaces on a shelter unit, laterally spaced suspension arm structures extending from the axle to the lifting bar, and fluid cylinder means trained between the suspension arms structures and bracket means for enabling the lifter bar to exert a lift action on the shelter unit: the improvement comprising a motorized wheel assembly mountable on the steering link to facilitate movement of the dolly unit to a position wherein its lifter elements are directly below the lift surfaces on the shelter unit; said motorized wheel assembly comprising a yoke structure that includes two laterally spaced arms extending downwardly relative to the steering link, a ground wheel carried within the yoke structure, said ground wheel having an axle extending between the spaced arms near their lower ends, a fluid-operated motor mounted between said arms in the space between the steering link and ground wheel, and drive-transmitting means between the motor and the axle of the ground wheel.

2. The improvement of claim 1 wherein the motorized wheel assembly is removably mounted on the steering link.

3. The improvement of claim 1 wherein the motorized wheel assembly is adjustably mounted on the steering link for movement from a first extending position in which the ground wheel is engaged with the ground surface to a second retracted position in which the ground wheel is spaced an appreciable distance above the ground surface.

4. The improvement of claim 1 wherein the motorized wheel assembly is clamped to the steering link for removal therefrom when the dolly is being used to transport a shelter unit to a new location.

5. The improvement of claim 1 wherein the motorized wheel assembly is clamped to the steering link for removal therefrom when the dolly is being used to transport a shelter unit to a new location; the yoke structure having an upper web wall adapted to facially engage the undersurface of the steering link, said yoke structure having threaded studs projecting upwardly beyond the plane of the steering link upper surface when the steering link is seated on the yoke structure web wall, a clamping plate having spaced openings registrable with the threaded studs so that the clamping plate can be positioned on the link upper surface with the studs extending through said openings, and nuts screwable on the exposed portions of the studs to exert clamping forces on the plate.

6. The improvement of claim 5: said yoke structure including spaced upstanding shoulder walls adapted to extend along side surfaces of the steering link when the motorized wheel assembly is clamped to the steering link, said shoulder walls acting to preclude undesired lateral displacement of the motorized wheel assembly relative to the steering link.

7. The improvement of claim 1 wherein the drive-transmitting means takes the form of an endless flexible drive element.

* * * * *